United States Patent
Balasubramanian et al.

(10) Patent No.: US 11,146,931 B2
(45) Date of Patent: Oct. 12, 2021

(54) PORTABLE WIRELESS AVIONICS INTRA-COMMUNICATION ADAPTER LOCATION SYSTEM

(71) Applicant: Rosemount Aerospace Inc., Burnsville, MN (US)

(72) Inventors: Rameshkumar Balasubramanian, Karnataka (IN); Pullaiah Dussa, Bangalore (IN)

(73) Assignee: ROSEMOUNT AEROSPACE, INC., Burnsville, MN (US)

( * ) Notice: Subject to any disclaimer, the term of this patent is extended or adjusted under 35 U.S.C. 154(b) by 0 days.

(21) Appl. No.: 16/572,817

(22) Filed: Sep. 17, 2019

(65) Prior Publication Data
US 2020/0120460 A1 Apr. 16, 2020

(30) Foreign Application Priority Data
Oct. 10, 2018 (IN) .............................. 201811038486

(51) Int. Cl.
*H04W 4/48* (2018.01)
*H04B 10/116* (2013.01)
*H04W 4/029* (2018.01)
*H04B 10/516* (2013.01)
*H04B 10/508* (2013.01)

(52) U.S. Cl.
CPC ............ *H04W 4/48* (2018.02); *H04B 10/116* (2013.01); *H04B 10/508* (2013.01); *H04B 10/516* (2013.01); *H04W 4/029* (2018.02)

(58) Field of Classification Search
CPC ...... H04W 4/48; H04W 4/029; H04B 10/116; H04B 10/508; H04B 10/516
See application file for complete search history.

(56) References Cited

U.S. PATENT DOCUMENTS

| 6,400,482 | B1 | 6/2002 | Lupton et al. | |
|---|---|---|---|---|
| 8,248,467 | B1* | 8/2012 | Ganick | H04W 4/029 348/116 |
| 2005/0228559 | A1* | 10/2005 | Bloch | G08G 5/0013 701/3 |
| 2009/0284366 | A1 | 11/2009 | Haartsen et al. | |

(Continued)

FOREIGN PATENT DOCUMENTS

| FR | 3030161 A1 | 6/2016 |
|---|---|---|
| WO | 2017026555 A1 | 2/2017 |

OTHER PUBLICATIONS

Anonymous "Application of Optical Wireless Communications for Avionics" ip.com Journal, Aug. 30, 2018 IPCOM000255105D (12 pages).

(Continued)

*Primary Examiner* — Thomas D Alunkal
(74) *Attorney, Agent, or Firm* — Cantor Colburn LLP

(57) ABSTRACT

A Wireless Avionics Intra-Communication (WAIC) system includes a communication network and a WAIC adapter location system. The communication network is configured to exchange data with a portable wireless device via WAIC adapter. The WAIC adapter location system is configured to determine a location of the WAIC adapter, which selectively connects and disconnects the portable device from the communication network based on the location.

17 Claims, 6 Drawing Sheets

(56) References Cited

U.S. PATENT DOCUMENTS

| | | | |
|---|---|---|---|
| 2016/0095045 A1* | 3/2016 | Salomon | H04W 4/42 |
| | | | 455/411 |
| 2017/0251365 A1 | 8/2017 | Burchardt et al. | |
| 2018/0139202 A1* | 5/2018 | Sethi | H04L 63/18 |
| 2018/0212679 A1* | 7/2018 | Shim | H04B 10/61 |
| 2018/0227051 A1 | 8/2018 | Shim et al. | |
| 2018/0288852 A1* | 10/2018 | Davies | G08C 23/04 |

OTHER PUBLICATIONS

Cogalan et al., "Inflight connectivity: Deploying different communication networks inside an aircraft" 2018 IEEE 87th Vehicular Technology Conference (VTC Spring). IEEE, Jun. 3, 2018 (pp. 1-6).
Extended European Search Report for European Application No. 19201559.2; Application Filing Date Oct. 4, 2019; dated Feb. 11, 2020 (11 pages).

* cited by examiner

PORTABLE WIRELESS AVIONICS INTRA-COMMUNICATION ADAPTER LOCATION SYSTEM

CROSS-REFERENCE TO RELATED APPLICATIONS

This application claims the benefit of Indian Application No. 201811038486 filed Oct. 10, 2018, which is incorporated herein by reference in its entirety.

BACKGROUND

Exemplary embodiments pertain to the art of aircraft communication systems, and more particularly, to Wireless Avionics Intra-Communication communication systems that employ portable wireless avionic devices.

Replacing aircraft wired communication systems with wireless communication has gained wide-spread attention in aircraft designs due to its improvement on fuel efficiency of the aircraft and its load carrying capacity. A current aircraft wireless communication system referred to as "Wireless Avionics Intra-Communication" (WAIC) allows for reliable short-range radio communication links between two or more aircraft systems, sub-systems and/or wireless devices located on-board the same aircraft. WAIC operates according to the Radio Altimeter (RA) spectrum, which ranges from 4.2 gigahertz (GHz) to 4.4 GHz. The wireless devices typically utilized on board aircrafts such as off-the-shelf portable electronic devices (PEDs, for example, operate according to a different spectrum (e.g., about 2.4 GHz). Therefore, a WAIC adapter is utilized to allow these wireless devices to operate in the WAIC system.

BRIEF DESCRIPTION

Disclosed is a Wireless Avionics Intra-Communication (WAIC) system comprising a communication network configured to exchange data with a portable wireless device, and a WAIC adapter location system configured to determine a location of a WAIC adapter. The WAIC adapter is configured to selectively connect and disconnect the portable device from the communication network based on the location.

Also disclosed is a Wireless Avionics Intra-Communication (WAIC) adapter location system comprising a light controller configured to generate an identification (ID) pattern and to drive at least one light emitting device to emit a series of light pulses indicative of the ID pattern. The WAIC adapter location system further includes a WAIC adapter configured to selectively establish signal connection with a communication network when the WAIC adapter is at location that receives the light pulses.

Also disclosed is a method of identifying a Wireless Avionics Intra-Communication (WAIC) adapter. The method comprises generating, via a light controller, an identification (ID) pattern, and driving at least one light emitting device to emit a series of light pulses indicative of the ID pattern. The method further comprises determining a location of the WAIC adapter based on the series of light pulses, and selectively exchanging data between the wireless device and the communication network in response to determining the WAIC adapter is located in an authorized location.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. The term "about" is intended to include the degree of error associated with measurement of the particular quantity based upon the equipment available at the time of filing the application.

As described above, a WAIC adapter allows off-the-shelf PEDs (e.g., computer tablets) to function in a WAIC system. These WAIC adapters are typically portable and can be connected and disconnected to a PED operated by authorized aircraft personnel (e.g., the flight crew). Once connected to the PED, the WAIC adapter allows the PED to exchange data with various systems of the aircraft. To ensure that the data exchange is authorized, it is important to determine the location of the WAIC adapter and allow the WAIC adapter to operate only while located within the cabin of the aircraft.

Various non-limiting embodiments described herein provides a portable WAIC adapter location system capable of determining a location of a WAIC adapter and controlling the operation of the WAIC adapter based on the determined location. In one or more embodiments, the WAIC adapter location system utilizes the cabin lighting system to output a modulated binary code that confirms whether the WAIC adapter is located in an authorized aircraft cabin. When authenticated, the WAIC adapter is activated to allow the PED to communicate with the WAIC. Otherwise, the WAIC adapter is deactivated, thereby preventing unauthorized communication with the WAIC.

Figure 1:
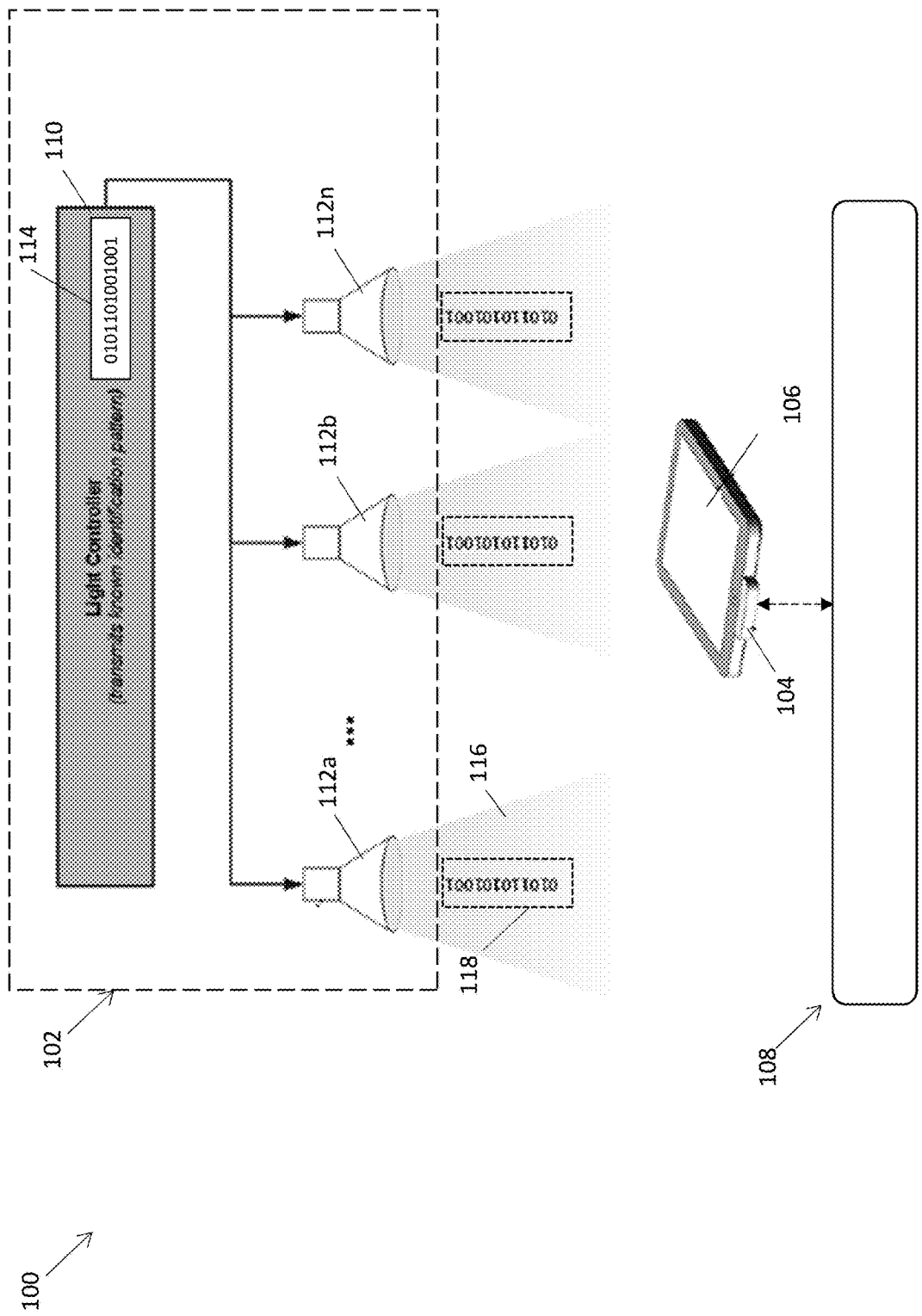
FIG. 1 depicts a WAIC system according to a non-limiting embodiment.

With reference now to FIG. 1, a WAIC system 100 is illustrated according to a non-limiting embodiment. The WAIC system 100 includes a portable WAIC adapter location system 102 configured to control a WAIC adapter 104 installed on a PED 106. As described herein, the WAIC adapter location system 102 determines whether the WAIC adapter 104 is located at an authorized location (e.g., within the cabin of a given aircraft). When the WAIC adapter location system 102 determines that the WAIC adapter 104 is located in an authorized area (e.g., within the cabin of an authorized aircraft), the adapter 104 is activated and allows the PED 106 to communicate with the aircraft's communication network 108. Otherwise, the WAIC adapter 104 is deactivated, thereby preventing data exchange between the PED 106 and the communication network 108.

The WAIC adapter location system 102 includes a light controller 110 in signal communication with one or more light emitting devices 112a, 112b, 112n. The light controller 110 is configured to generate an identification (ID) pattern 114 and to output a light driver signal that drives the light emitting devices 112a, 112b, 112n to emit light 116 according to the ID pattern 114.

The light emitting devices 112a, 112b, 112n can include various types of devices capable of emitting light including, but not limited to, a lamp, at least one light emitting diode, a liquid crystal display screen, etc. The light emitting devices 112a, 112b, 112n are configured to emit the light 116 in a manner that serves as an ID signal indicative of the ID pattern 114. The emitted ID signal includes a modulated pattern 118 of light pulses matching the ID pattern 114 that indicates an area at which the WAIC adapter 104 is authorized to operate.

Figure 2:
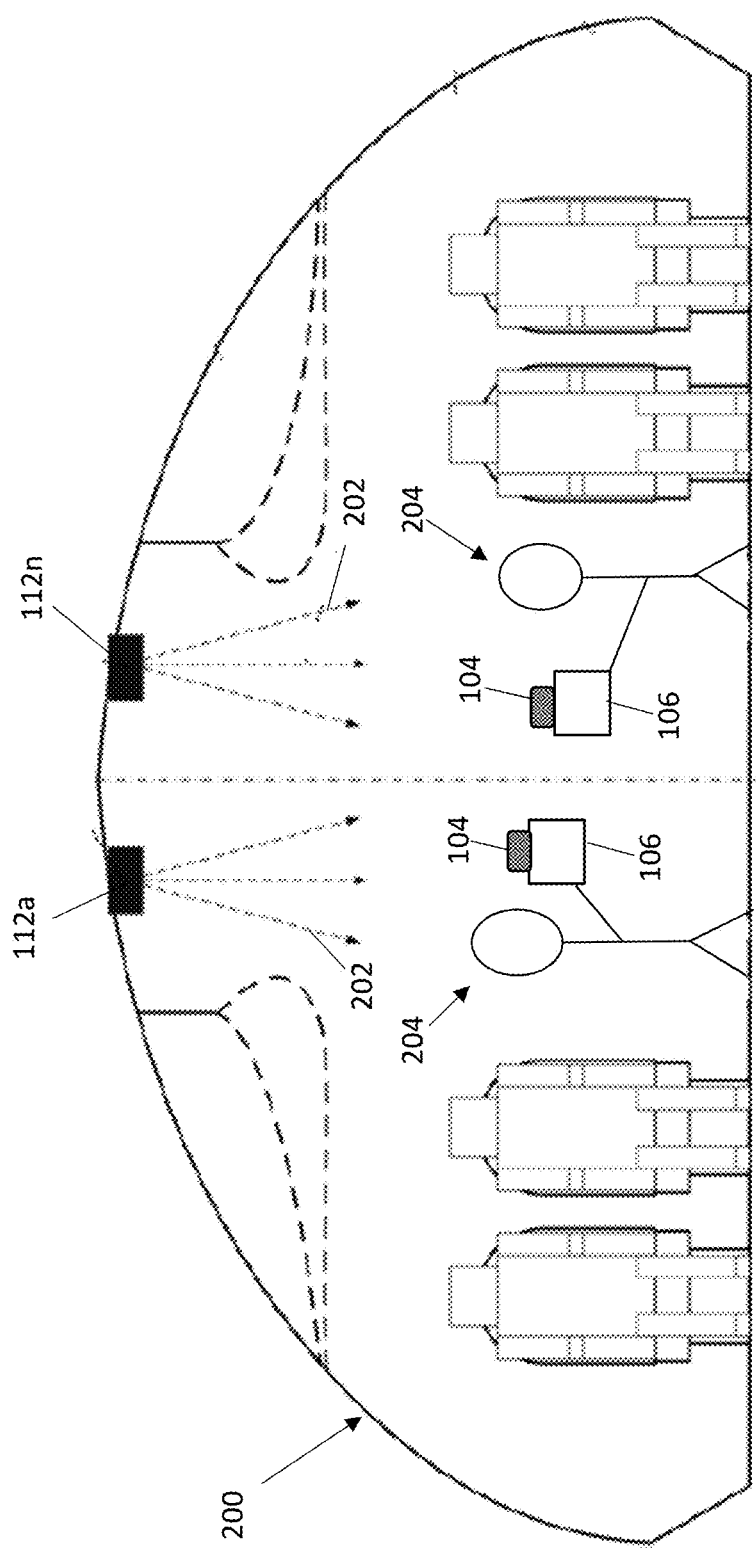
FIG. 2 illustrates an aircraft cabin installed with a portable WAIC adapter location system according to a non-limiting embodiment.

Referring to FIG. 2, for example, an aircraft cabin 200 is illustrated according to a non-limiting embodiment. The aircraft cabin 200 includes a plurality of light emitting devices 112a-112n that output an ID signal 202 generated by modulating the emitted light at a predetermined frequency. For example, the light can be pulsated at a frequency that ensures a stroboscopic effect (e.g., direct or indirect flicker) is not realized by the humans.

Flight crew operators 204 are authorized to possess various wireless devices 106 (e.g., computer tablets, laptops, etc.) that are configured to receive a WAIC adapter 104. The WAIC adapter 104 and/or the wireless device 106 can detect the ID signal 202 output from the light emitting devices 112a-112n, and determine whether it is operating in an authorized area, i.e., within the aircraft cabin 200. For example, the WAIC adapter 104 can detect the ID signal 202 when it is located within the cabin, but is unable to detect the ID signal 202 (i.e., the light emitted by the light emitting devices 112a-112n) when it is removed from a given area of the cabin 200 or from the aircraft completely. Accordingly, when the ID signal 202 is detected and authenticated, the WAIC adapter 104 can be activated and the wireless device 106 is capable of communicating with the communication network at the specified bandwidth frequency (e.g., 4.2 GHz to 4.4 GHz). Otherwise, the WAIC adapter 104 is deactivated thereby preventing the wireless device 106 from operating at the frequency (e.g., 4.2 GHz to 4.4 GHz) necessary to exchange data with the aircraft's communication network.

Figure 3:
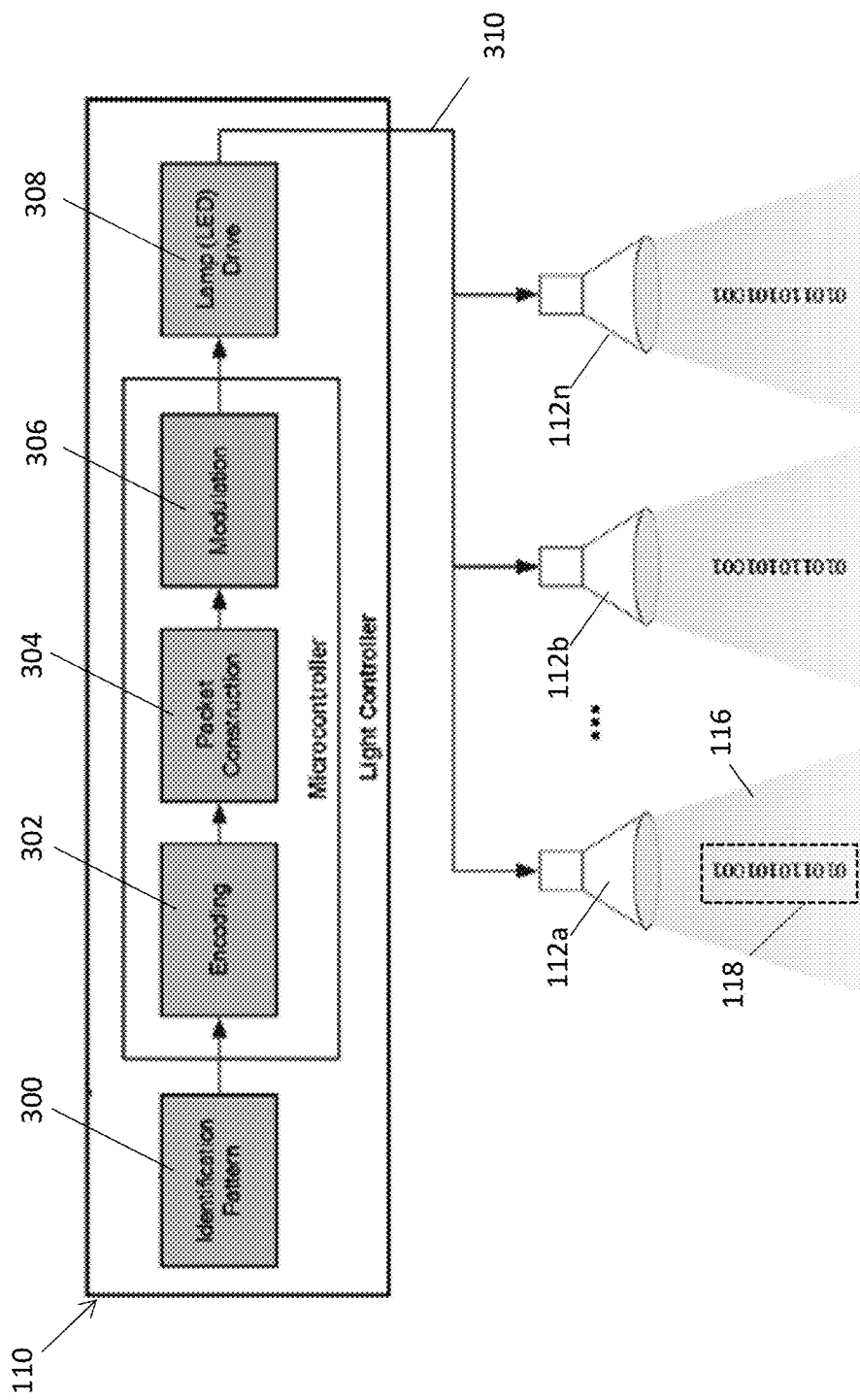
FIG. 3 is a block diagram of a portable WAIC adapter location system according to a non-limiting embodiment.

Turning to FIG. 3, the light controller 110 is illustrated in greater detail. The light controller 110 includes a memory unit 300, an encoding unit 302, a packet construction unit 304, a modulation unit 306, and a light signal driver 308. Any one of the encoding unit 302, packet construction unit 304, modulation unit 306, and light signal driver 308 can be constructed as an electronic hardware controller that includes memory and a processor configured to execute algorithms and computer-readable program instructions stored in the memory. The memory unit 300, encoding unit 302, packet construction unit 304, modulation unit 306, and light signal driver 308 can also be integrated together in a single hardware controller.

The memory unit 302 is configured to store the ID pattern 114. The ID pattern can be represented as a sequence of binary values (e.g., 0's and 1's), or an ASCII representation, which can later be converted into its corresponding binary values. In at least one embodiment, the ID pattern can correspond to the entire internal area (e.g., cockpit, passenger cabin, etc.). In other embodiments, individual ID patterns can be stored in the memory unit 302, where each ID pattern corresponds to a particular area of the cabin. For instance, a first ID pattern may correspond to the cockpit, a second ID pattern may correspond to the first-class cabin area, a third ID pattern may correspond to the economy cabin area, etc.

The encoding unit 302 is configured to encode the binary values into symbol sequences. In at least one embodiment, the encoding unit converts the ASCII representation of the ID pattern into its corresponding binary values, and then converts the binary values into a sequence of encoded symbols. The packet construction unit 304 can then frame the encoded symbols into data packets based on a channel/line capacity.

The modulation unit 306 is configured to modulate the data packets using various digital modulation techniques. The digital modulation techniques include, but are not limited to, On-Off Keying (OOK), OOK with Manchester encoding, Pulse Width Modulation (PWM), and OFDM (Orthogonal Frequency Division Multiplexing).

The light signal driver 308 receives the modulated packets and generates a light driver signal 310 according to a set frequency. In at least one embodiment, the light driver signal drives the light emitting devices 112a, 112b, 112n to generate a modulated pattern 118 of light pulses that the ID pattern 114 stored in the memory unit 300.

The light emitting devices 112a, 112b, 112n are configured to emit light 116 that defines a modulated signal 118 indicative of the ID pattern 114 (i.e., stored in the memory unit 300) in response to the light driver signal 310. In at least one embodiment, the light driver signal 310 causes the light emitting devices 112a, 112b, 112n to pulsate the light 116 at a frequency at which humans do not realize a stroboscopic effect (i.e., direct or indirect light flicker).

Figure 4:
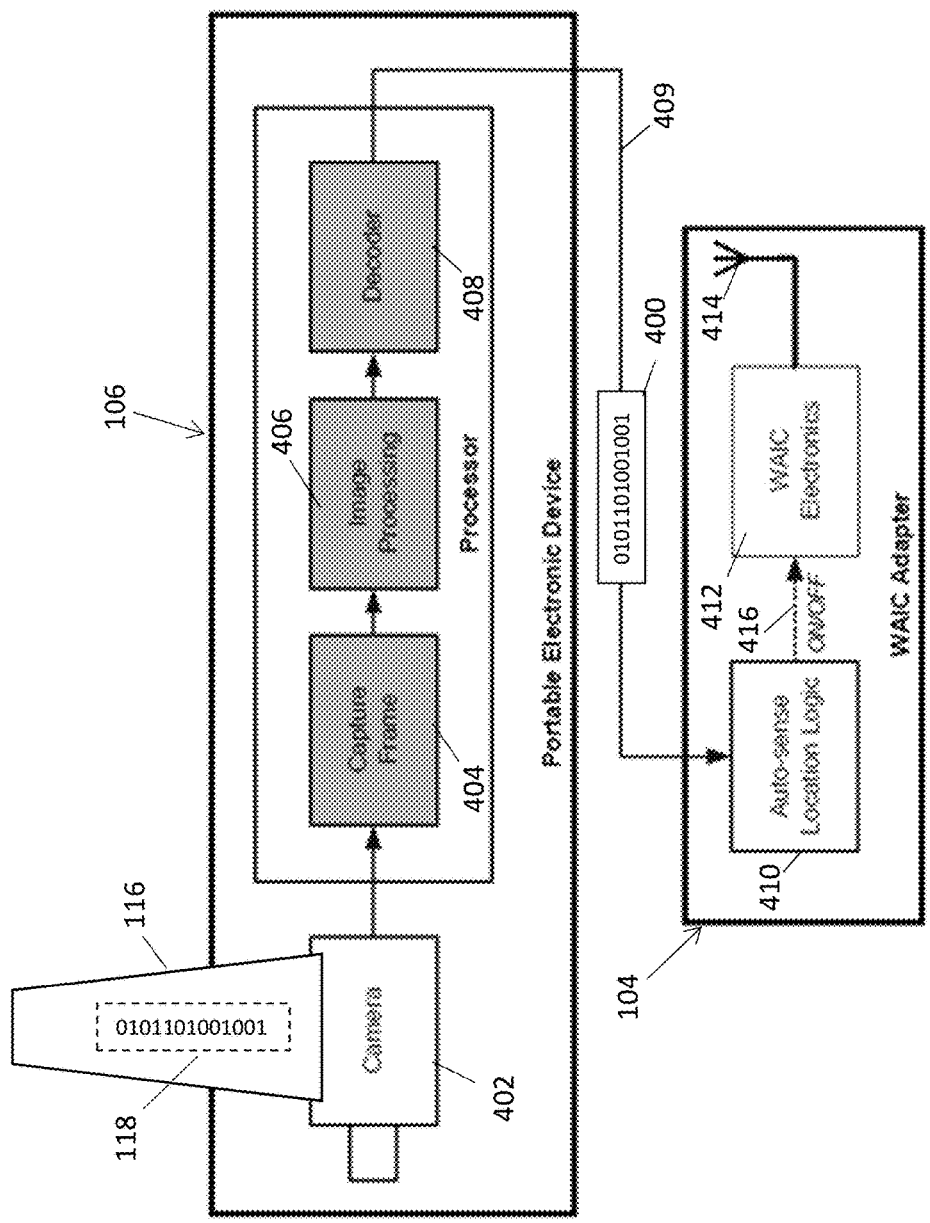
FIG. 4 is a block diagram of a WAIC adapter installed on a portable electronic device according to a non-limiting embodiment.

Turning now to FIG. 4, the WAIC adapter 104 and the wireless device 106 (e.g. PED) are illustrated in greater detail. The WAIC adapter 104 and/or the wireless device 106 includes an ID signal decoder system configured to convert the emitted light pulses 116 into a decoded binary pattern 400. In the example, illustrated in FIG. 4, the wireless device 106 (e.g., PED) is implemented with the ID signal decoder system. It should be appreciated, however, that the ID signal decoder system can be implemented in the WAIC adapter 104. In other embodiments, one or more components of the ID signal decoder system can be implemented in the wireless device 106 while other components of the ID signal decoder can be implemented in the WAIC adapter 104.

The ID signal decoder system includes a light detector device 402, a frame controller 404, an image processor 406, and a binary decoder circuit 408. The ID signal decoder system can operate according to a rolling shutter capturing technique to capture the frame/image of the pulsed light 116 in a row sequential manner as described in greater detail below.

The light detector device 402 includes an electrical circuit configured to detect the light pulses 116 emitted from the at least one light emitting device 112a, 112b, 112n. The light detector device 402 can include, for example, an image sensor or camera.

The frame controller 404 is in signal communication with the light detector device 402 and is configured to determine a data frame based on the light pulses 116. The data frame can include, for example, an amount of the light pulses 116 captured over a predetermined time period (e.g., 5 seconds).

The image processor 406 is in signal communication with the frame controller 404. Accordingly, the image processor 406 processes one or more frames output from the frame controller 404, and determines a series of light and dark pulses corresponding to the emitted light pulses 116.

The binary decoder circuit 408 is in signal communication with the image processor 406. The binary decoder circuit 408 is configured to determine the decoded binary pattern 400 based on the series of light and dark pulses included in the data frame, and generates a decoded binary signal 409 indicative of the decoded binary pattern 400. The decoded binary pattern 400 matches the modulated signal 118, which in turn matches the ID pattern 114 stored in the memory unit 300 of the light controller 110.

The WAIC adapter 104 includes a location controller 410 and a WAIC circuit 412. The location controller 410 is configured to receive the decoded binary signal 409, and generates a control signal 416 based on the decoded binary pattern 400. The control signal 416 selectively activates or deactivates the WAIC circuit 412. When activated, the WAIC circuit 412 establishes communication with the communication network via an antenna 414.

In at least one embodiment, the location controller 410 includes memory that stores a secondary ID pattern intended to match the ID pattern 114 stored in the memory unit 300 of the light controller 110. Accordingly, the location controller 410 generates the control signal 416 to activate the WAIC circuit 412 in response to detecting a match between the decoded ID pattern 400 (obtained from the modulated ID pattern 118) and the stored secondary ID pattern. Therefore, the WAIC adapter 104 is not activated when the modulated ID pattern 118 indicated by the pulsed light 116 is not detected and/or when the modulated ID pattern 118 does not match the secondary ID pattern stored in the location controller 410. When, however, the modulated ID pattern 118 does not match the secondary ID pattern stored in the location controller 410, the control signal 416 deactivates the WAIC circuit 412, which allows the wireless device 106 to operate at the frequency band (e.g. the RA spectrum) specified by the communication network. In this manner, the wireless device 106 is determined to be operating in an authorized location, and is allowed to exchange data with the communication network.

Figure 5A:
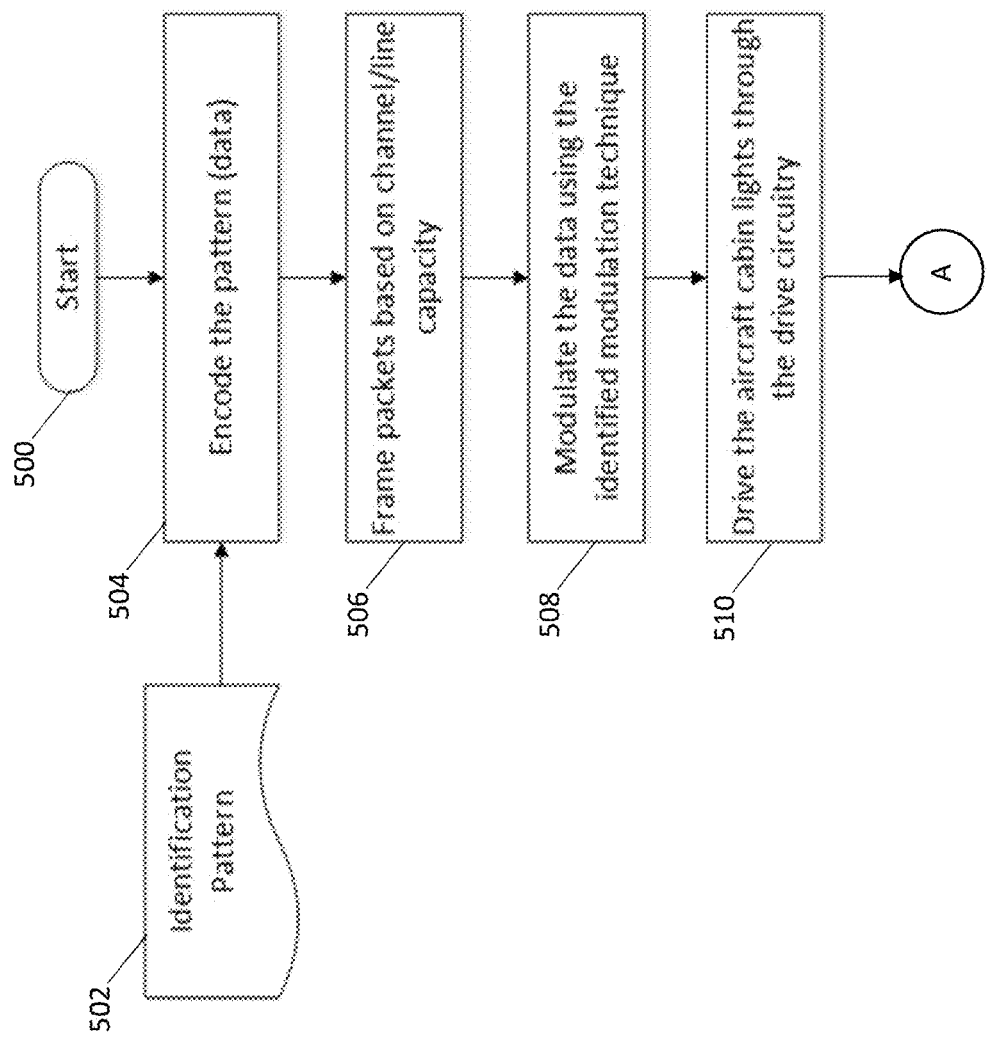
FIGS. 5A and 5B depict a flow diagram illustrating a method of detecting and controlling a WAIC adapter according to a non-limiting embodiment.
Figure 5B:
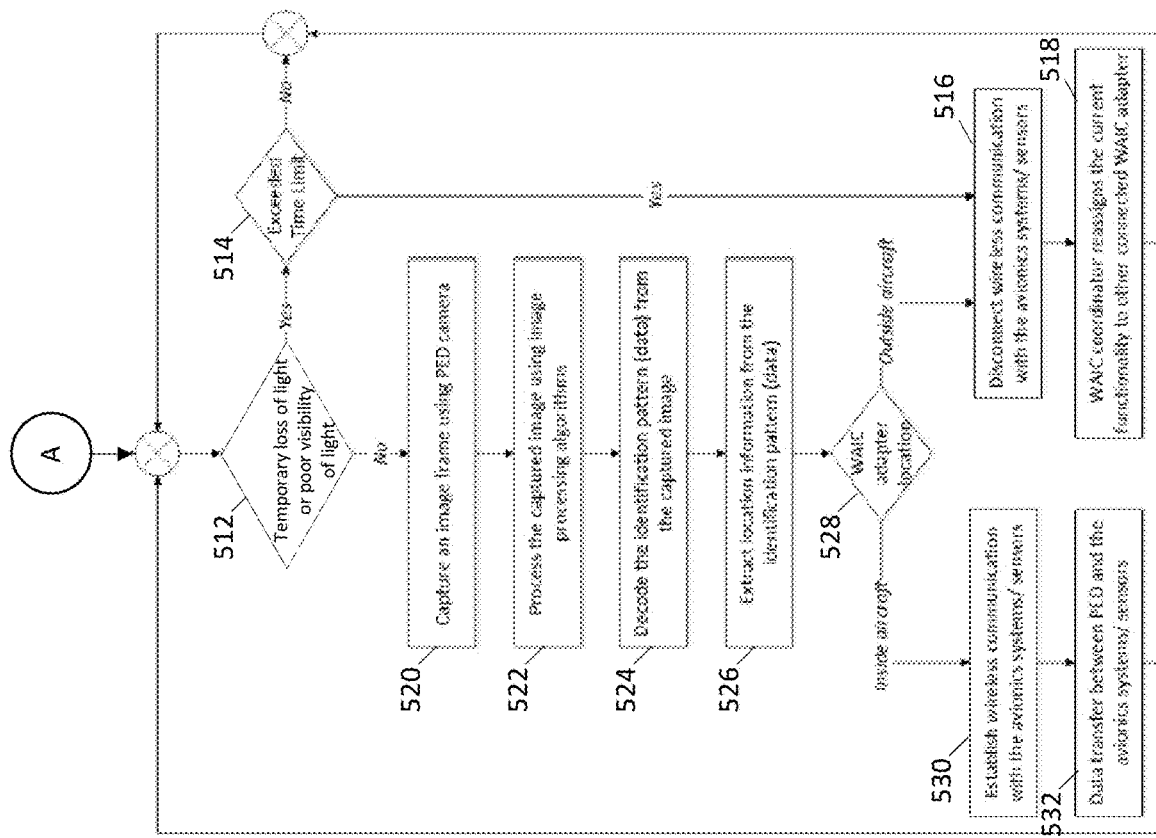

Referring now to FIGS. 5A and 5B a method of detecting and controlling a WAIC adapter is illustrated according to a non-limiting embodiment. The method begins at operation 500, and at operation 502 an ID pattern is obtained. The ID pattern can be stored in a memory unit and can be unique to an individual aircraft or can be unique to a particular area internal to the aircraft. At operation 504, the ID pattern is encoded, and at operation 506 the encoded symbols are framed into data packets based on a channel/line capacity. At operation 508, the data packets are modulated using various digital modulation techniques. At operation 510, a light driver signal is generated that drives the light emitting devices to generate a modulated pattern 118 of light pulses 116. In one or more embodiments, the light driver signal drives the light emitting devices at a frequency at which a stroboscopic effect (e.g., direct or indirect flicker) is not realized by the humans.

Turning to operation 512 (see FIG. 5B), a determination is made as to whether a light detection interruption event has occurred. The light detection interruption event can occur, for example, when emitted light from a portable WAIC adapter location system is not detected or is poorly detected by a wireless device and/or a WAIC adapter connected to the wireless device. When a light detection interruption event has occurred, the method determines whether the light detection interruption event exceeds a threshold time limit at operation 514. When the light detection interruption event does not exceed the threshold time limit, the method returns to operation 512 and continues monitoring for a light detection interruption event. When, however, the light detection interruption event exceeds a threshold time limit, wireless communication between the wireless device and the aircraft communication network is blocked at operation 516. In at least one embodiment, the wireless communication can be prevented by deactivating the WAIC adapter connected to the wireless device. At operation 518, the WAIC system (e.g., a controller operating the WAIC system) can assign the functionality originally assigned to the disconnected wireless device to a different or other available wireless device, and the operations described above can be applied to the other available wireless device.

Referring back to operation 512 and a light detection interruption event has not occurred, the method proceeds to operation 520 and detects the light emitted by the light emitting device interfaced with the WAIC adapter location system. In at least one non-limiting embodiment, the emitted light is captured as an image frame using an image sensor installed on the wireless device and/or the WAIC adapter. At operation 522 the captured image is processed to generate digital data, and the data is decoded at operation 524 to determine the ID pattern indicated by the emitted light. At operation 526, the decoded ID pattern is used to determine the location of the WAIC adapter and wireless device. When the decoded ID pattern indicates that the WAIC adapter and wireless device are located at an authorized communication area (e.g., inside the aircraft) at operation 528, wireless communication between the wireless device and the aircraft communication network is established at operation 530. In at least one embodiment, the wireless communication can be established by activating the WAIC adapter connected to the wireless device. Accordingly, data generated by the wireless device is output at frequency bandwidth set by the communication network (e.g., the RA spectrum) such that the wireless device can exchange data with other systems, components, etc. connected to the communication network at operation 532.

When, however, the decoded ID pattern indicates that the WAIC adapter and wireless device are outside of an authorized communication area (e.g., outside the aircraft), wireless communication between the wireless device and the communication network is blocked at operation 516. In at least one embodiment, the wireless communication can be prevented by deactivating the WAIC adapter connected to the wireless device. At operation 518, the WAIC system (e.g., a controller operating the WAIC system) can assign the functionality originally assigned to the disconnected wireless device to a different or other available wireless device, and the operations described above can be applied to the other available wireless device.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A Wireless Avionics Intra-Communication (WAIC) system, the WAIC system comprising:
   a communication network configured to exchange data with a portable wireless device;
   a portable WAIC adapter configured to be physically connected and disconnected to and from the portable wireless device and configured to facilitate the exchange of data between the portable wireless device and the communication network while connected to the portable wireless device;
   a WAIC adapter location system configured to determine a location of the WAIC adapter, the WAIC adapter configured to selectively connect and disconnect the portable device from the communication network based on the location, the WAIC adapter location system comprising a light controller configured to generate an identification (ID) pattern that is stored in a memory unit of the light controller, wherein the location of the WAIC adapter is determined based at least in part on the ID pattern,
   wherein the WAIC adapter comprises:
      a location controller including a memory configured to store a secondary ID pattern and the location controller is configured to determine the ID pattern indicated by the emitted light; and
      a WAIC circuit configured to selectively establish signal communication with the communication network based on the ID pattern, and
   wherein the location controller activates the WAIC circuit in response to detecting a match between the determined ID pattern and the secondary ID pattern.

2. The WAIC system of claim 1, wherein the light controller generates a light driver signal that operates at least one light emitting device according to the modulation frequency, wherein the location of the WAIC adapter is based at least in part on the operation of the at least one light emitting device.

3. The WAIC system of claim 2, wherein the at least one light emitting device is configured to emit light that defines an ID signal indicative of the ID pattern in response to the light driver signal.

4. The WAIC system of claim 1, wherein the WAIC circuit deactivates the WAIC circuit in response to the ID pattern being different from the secondary ID pattern.

5. A Wireless Avionics Intra-Communication (WAIC) adapter location system comprising:
   a light controller configured to generate an identification (ID) pattern and to drive at least one light emitting device to emit a series of light pulses indicative of the ID pattern, the light controller including a memory unit configured to store the ID pattern; and
   a portable WAIC adapter comprising a location controller that includes memory configured to store a secondary ID pattern, the portable WAIC adapter configured to physically be connected or disconnect to and from a portable electronic device, the portable WAIC configured to selectively establish signal connection with a communication network when the WAIC adapter is at location that receives the light pulses.

6. The WAIC adapter location system of claim 5, wherein the light controller comprises:
   an encoding unit configured to convert the ID pattern into encoded symbol sequences;
   a packet construction unit configured to frame the encoded symbol sequences into data packets;
   a modulation unit configured to modulate the data packets according to a modulation frequency; and
   a light signal driver configured to generate a light driver signal that drives the at least one light emitting device according to the modulation frequency.

7. The WAIC adapter location system of claim 6, wherein the WAIC adapter comprises:
   a WAIC circuit configured to selectively establish signal communication with the communication network based on the ID pattern and
   wherein the location controller is configured to determine the ID pattern indicated by the light pulses.

8. The WAIC adapter location system of claim 7, wherein the location controller stores a secondary ID pattern, and activates the WAIC circuit in response to detecting a match between the determined ID pattern and the secondary ID pattern.

9. The WAIC adapter location system of claim 7, wherein the WAIC circuit automatically deactivates the WAIC circuit in response to the ID pattern being different from the secondary ID pattern.

10. A method of identifying a Wireless Avionics Intra-Communication (WAIC) adapter, the method comprising:
    physically connecting the WAIC adapter to a portable wireless device, the WAIC adapter comprising a location controller including a memory configured to store a secondary identification (ID) pattern;
    generating, via a light controller, an identification (ID) pattern and storing the ID pattern in a memory unit included in the light controller;
    driving at least one light emitting device to emit a series of light pulses indicative of the ID pattern;
    determining a location of the WAIC adapter based on the series of light pulses; and
    selectively exchanging data between the portable wireless device and the communication network while the WAIC adapter is connected to the portable wireless device in response to determining the WAIC adapter is located in an authorized location.

11. The method of claim 10, further comprising determining a match between the ID pattern indicated by the light pulses and a secondary ID pattern to determine the WAIC adapter is located in the authorized location.

12. The method of claim 11, wherein driving the at least one light emitting device comprises:
    converting, via an encoding unit, the ID pattern into encoded symbol sequences;
    framing, via a packet construction unit the encoded symbol sequences into data packets;
    modulating, via a modulation unit, the data packets according to a modulation frequency; and
    generating, via a light signal driver, a light driver signal that drives the at least one light emitting device according to the modulation frequency to generate the ID pattern.

13. The method of claim 12, further comprising:
    determining, via the WAIC adapter, the ID pattern indicated by the emitted light; and selectively establishing a signal communication between the wireless device and the communication network, via the WAIC adapter, based on the ID pattern.

14. The method of claim 13, wherein selectively establishing the signal communication comprises:
generating a control signal, via a location controller included in the WAIC adapter, based on a comparison between the ID pattern and the secondary ID pattern;
selectively activating a WAIC circuit included in the WAIC adapter based on the control signal; and
in response to activating the WAIC circuit, operating the wireless device at a frequency band set by the communication network.

15. The method of claim 14, wherein selectively establishing the signal communication further comprises automatically deactivating the WAIC circuit in response to the ID pattern being different from the secondary ID pattern.

16. The WAIC system of claim 1, wherein the light controller generates a plurality of individual ID patterns that are stored in the memory unit of the light controller, each individual ID pattern corresponding to a a different area of an aircraft cabin supported by the communication network.

17. The method of claim 10, wherein the light controller generates a plurality of individual ID patterns that are stored in the memory unit of the light controller, each individual ID pattern corresponding to a a different area of an aircraft cabin supported by the communication network.

* * * * *